Patented Sept. 13, 1927.

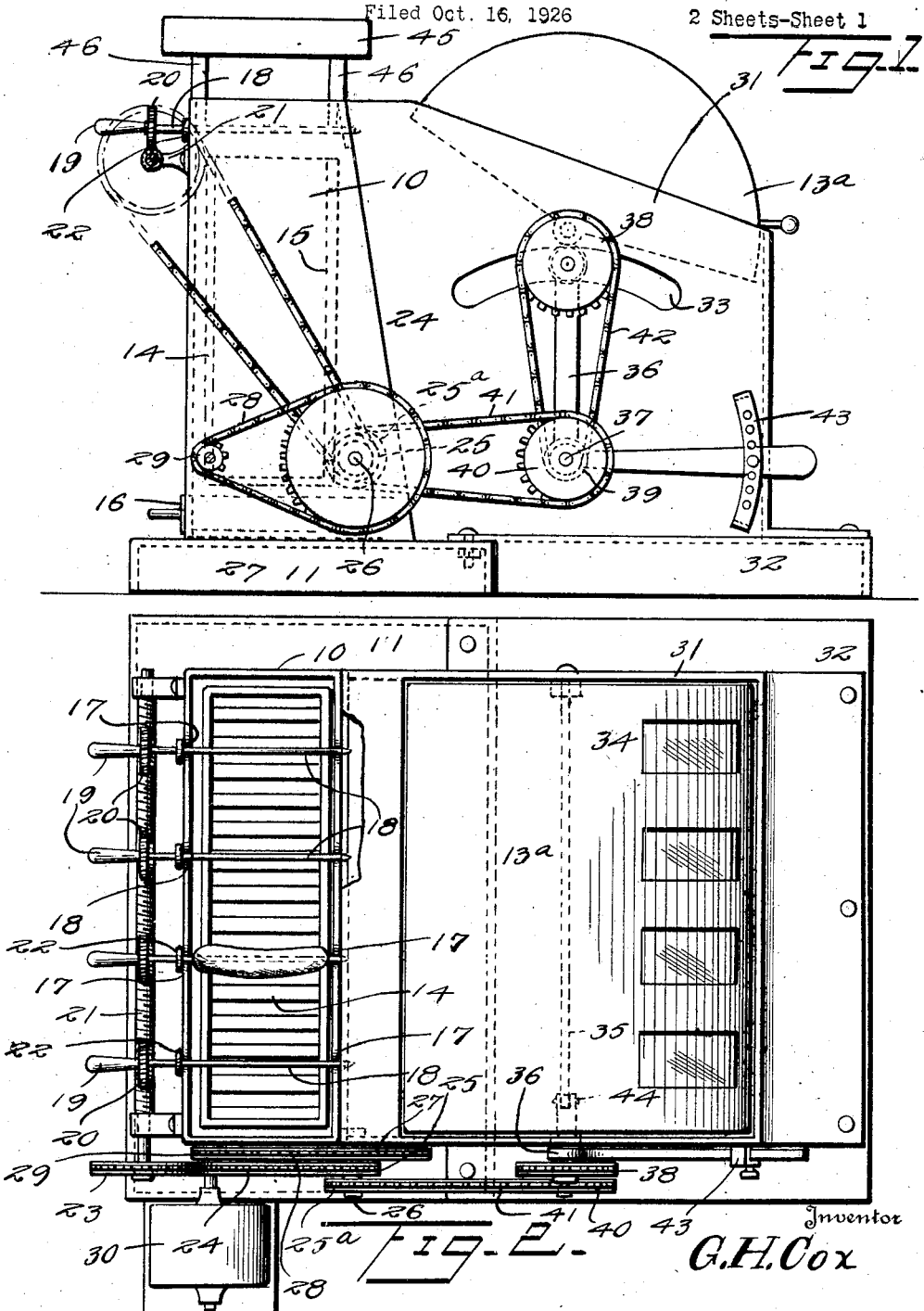

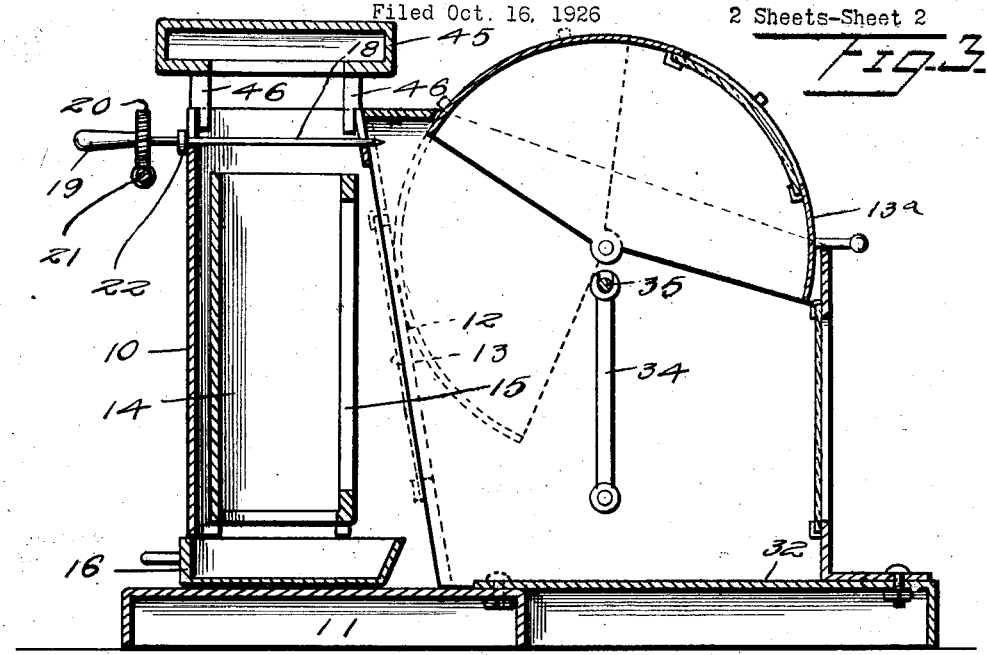
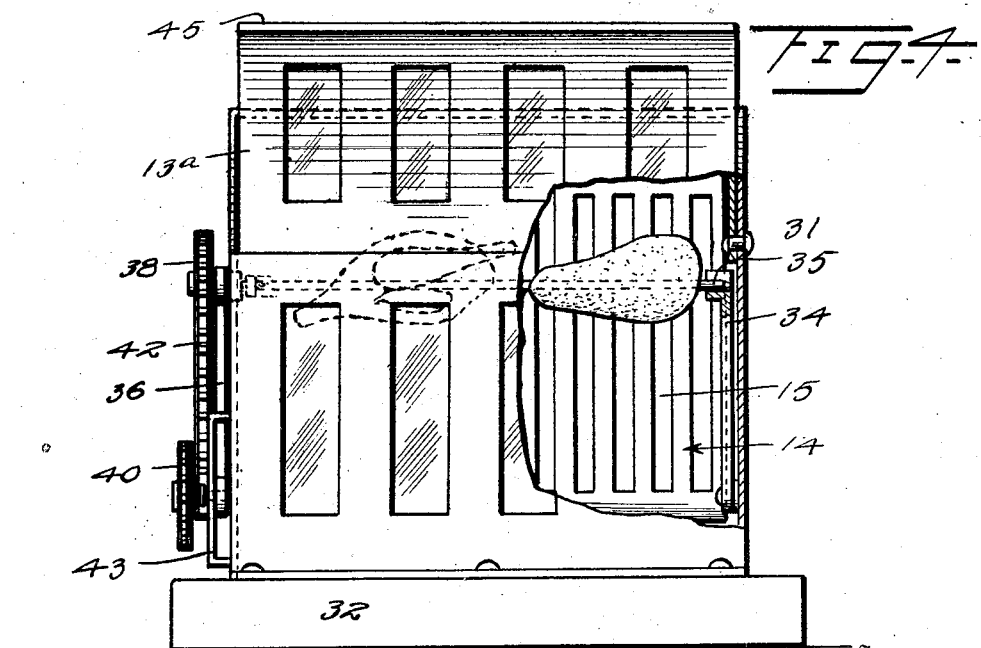

1,642,604

UNITED STATES PATENT OFFICE.

GEORGE HOLMES COX, OF DETROIT, MICHIGAN.

COOKING APPLIANCE.

Application filed October 16, 1926. Serial No. 142,107.

This invention relates to cooking appliances and particularly to means for roasting wiener sausages, cooking Hamburg sausages and roasting ham, chicken or other meats, before an open fire and on a spit.

The general object of the present invention is to provide a cooking appliance designed to be used in small restaurants, cafés, and the like so designed that the food may be seen while it is being cooked, the appliance thus forming an attractive display feature for the restaurant or café.

A further object is to provide a machine of this character so designed that it may be used for cooking wienerwursts on spits and open to observation, and which may also be used for the cooking of other foods on spits and under observation, and which is provided with an attachment whereby Hamburg steaks or sausages may be cooked.

A still further object is to provide means whereby the spits supporting the wienerwursts may be constantly turned by power transmitted from a motor and whereby the spit supporting the articles being roasted may also be constantly turned by the motor.

Still another object is to provide means whereby the last named spit may be shifted nearer to or further from the fire to control the roasting process.

Other objects will appear in the course of the following description.

My invention is illustrated in the accompanying drawings wherein:—

Figure 1 is a side elevation of a cooking appliance constructed in accordance with my invention;

Fig. 2 is a top plan view of the construction shown in Figure 1;

Fig. 3 is a vertical longitudinal section;

Fig. 4 is a front elevation with the front partly broken away.

Referring to these drawings 10 designates a casing which is closed at its rear and on its sides and which preferably is made of metal, and rests upon a base 11 having downwardly extending flanges. This casing is preferably open at the top and a front plate 12 having inset therein mica sheets 13 may be disposed over the front of this casing so that the operation of cooking the wienerwursts may be observed by the public. This plate is shown in dotted lines in Figure 3.

Disposed within the casing 10 is a fire box 14 which is preferably of fire brick or cast iron, lined around the ends and one side with asbestos board. The front face of this fire box is formed with an open grate 15 through which the fire may be seen and the heat escape to the spits 35. The fire box is provided with any suitable means whereby the coals may be shaken down from time to time and with an ash pan 16. I do not wish to be limited to the use of a fire box holding glowing coals as an electric heater might be used.

The rear and front walls of the casing 10 are provided with a series of slots 17 to hold a number of spits 18, upon which wienerwursts may be impaled. Each spit is provided with a handle 19 and with a gear wheel 20. Mounted in suitable bearings upon the rear wall of the casing 10 is a worm shaft 21 with which the gear wheels 20 are adapted to engage. In order to hold the gear wheels 20 in proper engagement with the screw-shaft I preferably provide each spit with a collar 22 which engages against the wall of casing 10 and which will hold the gear wheels from any tendency to tip while at the same time permitting them to rotate.

The skewers or spits 18 may be readily withdrawn from the slots 17 for the removal or insertion of sausages and any number of spits or skewers may be used. The shaft 21 carries upon one end the sprocket or band wheel 23 which is driven by means of the sprocket or band 24 from a relatively small sprocket wheel 25 mounted upon a shaft 26 carrying a relatively large sprocket wheel 27 from which a band 28 passes over a small sprocket wheel 29 carried by the shaft of an electric motor 30. Thus, the speed of the screw-shaft 21 is reduced from that of the motor.

For the purpose of simultaneously roasting chickens, hams, or other meats, I provide an extension casing 31 which may also be made of metal and consists of two sides, a top, and a bottom, the bottom being designated 32 and being adapted to be bolted upon the base 11 and extend out from this base. The rear edges of the side walls of casing 31 are rearwardly inclined to fit against the rearwardly inclined front edges of the side walls of casing 10. A swingingly mounted front wall 13ª is used on casing 31 which may be turned over to a position between the casing 10 and casing 24 to thus protect the operator from the heat when removing an article from the spit 35. This wall 13ª is also provided with mica windows.

One side wall of the casing 31 is provided with an arcuate slot 33 while the opposite wall is provided with a movable bearing 34. A split extends through this arcuate slot and is removably mounted upon the bearing 34 and one arm 36 of a bell crank lever, which in turn is mounted upon a pivot 37. The extremity of the spit carries a band wheel or sprocket wheel 38 and the pivot 37 constitutes a shaft supporting a relatively small sprocket wheel 39 and a relatively large sprocket wheel 40 which is driven from a sprocket wheel 25ª on shaft 26 by means of the sprocket chain 41. The small sprocket wheel 39 is connected to the wheel 38 by means of the sprocket chain or band 42. The other arm of the bell crank lever 36 operates over a rack 43 and by this means the spit 35 may be shifted nearer to or further from the fire, as desired, and held in this shifted position. It will be understood that the spit 35 may be removed from the sprocket wheel 38 and arm 36 in which the sprocket wheel is mounted, or that the spit 35 may have a flexible connection 44 with the shaft carrying sprocket wheel 38, so that the spit may be turned upward to carry its free end away from the bearing 34 to permit the removal or insertion of meats thereon.

For the purpose of cooking Hamburg steaks or the like I provide a cooking or heating plate 45, which is hollow and open at its bottom and adapted to be inserted between the walls 31 or between the end walls of the casing 10. By using this plate 45 on the top at one end of the machine, it is possible to cook Hamburg steak, toast, wienerwursts and roast or barbecue ham, chicken or other meats at the same fire and at the same time. Obviously the plate 45 may be used for toasting bread, heating rolls, or other cooking operations.

This plate 45 is supported on four legs 46 which extend down into the upper end of the casing 10 and support the plate 45 in such spaced relation to the top of the casing that the skewers may be readily removed.

It is obvious from what has gone before that my cooking appliance may be used merely for the purpose of toasting wienerwursts or may be used for toasting wienerwursts and cooking Hamburg steaks or may at the same time be used for roasting relatively large pieces of meat or other food.

The fire is observable through the mica inserts in the front of the machine and the cooking is also observable in the same manner. The top of the casing 10 is preferably open but the top of the extension casing 31 may either be open or provided with a lid. I do not wish to be limited to the particular heat generating means illustrated, as electric coils or a gas grate may be used in place of the coal grate.

I claim:—

1. A cooking appliance comprising a casing, a heating means within the casing, the front of the casing being open, and the casing at its top being formed with vertical slots, skewers removably disposed within said slots and when in use extending across the casing above the heating means therein, an extension casing disposed against the first named casing, a rotatable spit mounted in the side walls of the extension casing and extending at right angles to the skewers, a motor, and means operated by the motor for simultaneously rotating the last named spit and said skewers.

2. A cooking appliance comprising a casing, a heating means within the casing, the front of the casing being open, and the casing at its top being formed with vertical slots, skewers removably disposed within said slots and when in use extending across the casing above the heating means therein, an extension casing disposed against the first named casing, a rotatable spit mounted in the side walls of the extension casing and extending at right angles to the skewers, a motor, means operated by the motor for simultaneously rotating the last named spit and said skewers, and means whereby the spit may be adjusted nearer to or further from the heating means.

3. A cooking appliance comprising a casing having a base, side walls, and a rear wall and open at the top, a fire box disposed within the casing and extending vertically therein and having a front grate, the casing above said fire box being provided with a plurality of vertical slots, removable spits adapted to be disposed in said slots, each spit having a handle and a gear wheel, a worm shaft mounted upon the rear wall of the casing with which the gear wheels of the several spits are adapted to engage, a motor mounted upon said base and operatively connected to the worm shaft to drive the same, a detachable extension casing having a base and placed against the first named casing to receive heat therefrom, a lever mounted upon the exterior of the extension casing, a spit carried by said lever and movable thereby toward or from the fire, means operated by said motor for rotating said spit, and a front plate adapted to be disposed either against the first named casing or the extension casing and having transparent panes.

4. A cooking appliance of the character described including a casing having side walls and end walls at its top, a heating means disposed within the casing, a rotatable food supporting member carried within the casing above the heating means, and a hollow cooking plate having downwardly extending legs engaging the side walls of the casing and supporting the cooking plate in spaced relation to the upper edges of the side walls, said cooking plate having an opening in its bottom from which the heat may pass into the interior of the cooking plate.

In testimony whereof I hereunto affix my signature.

GEORGE H. COX.